US011443089B1

United States Patent
Geogdjaev (10) Patent No.: US 11,443,089 B1
(45) Date of Patent: Sep. 13, 2022

(54) TIMING VERIFICATION OF NON-STANDARD LIBRARY BLOCKS

(71) Applicant: Amazon Technologies, Inc., Seattle, WA (US)

(72) Inventor: Yuri Geogdjaev, Netanya (IL)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/249,833

(22) Filed: Mar. 15, 2021

(51) Int. Cl.
  *G06F 30/30* (2020.01)
  *G06F 30/3315* (2020.01)
  *G06F 30/367* (2020.01)
  *G06F 119/12* (2020.01)
  *G06F 30/3312* (2020.01)

(52) U.S. Cl.
  CPC ........ *G06F 30/3315* (2020.01); *G06F 30/367* (2020.01); *G06F 30/3312* (2020.01); *G06F 2119/12* (2020.01)

(58) Field of Classification Search
  None
  See application file for complete search history.

(56) References Cited

U.S. PATENT DOCUMENTS

| | | | | |
|---|---|---|---|---|
| 6,766,506 | B1* | 7/2004 | Ratzlaff | G06F 30/367 716/115 |
| 7,055,121 | B1* | 5/2006 | Bolander | G06F 30/327 716/133 |
| 7,418,679 | B1* | 8/2008 | Vashi | G06F 30/3312 716/108 |
| 7,689,953 | B1* | 3/2010 | Newmark | G06F 30/3312 716/113 |
| 7,958,473 | B2* | 6/2011 | Dirks | G06F 30/3312 716/108 |
| 8,799,839 | B1* | 8/2014 | Tetelbaum | G06F 30/3312 716/108 |
| 9,798,840 | B1* | 10/2017 | Ginetti | G06F 30/20 |
| 10,031,986 | B1* | 7/2018 | Kumar | G06F 30/3312 |

* cited by examiner

*Primary Examiner* — Leigh M Garbowski
(74) *Attorney, Agent, or Firm* — Weaver Austin Villeneuve & Sampson LLP (57) ABSTRACT

To check the timing of a signal path involving an integrated circuit block from an outside vendor, a signal path including a driver circuit, an interconnect, and a receiver circuit can be identified in the integrated circuit design. A substitute integrated circuit design can be generated by replacing the driver circuit of the signal path with a primitive standard library cell, providing parasitic parameters of the interconnect in a format compatible with a static timing analysis tool, and replacing the receiver circuit with one or more capacitors. A static timing analysis tool can then be executed on the substitute integrated circuit design to determine whether a propagation delay from the driver circuit to the receiver circuit of the signal path satisfies a timing requirement of the integrated circuit design.

20 Claims, 10 Drawing Sheets

TIMING VERIFICATION OF NON-STANDARD LIBRARY BLOCKS

BACKGROUND

As transistor sizes shrink, integrated circuit devices are incorporating greater and greater amounts of computing power and functionality into a single chip. For example, system-on-a-chip (SoC) devices may incorporate multiple processors, memory subsystem, acceleration engine (e.g., graphics processing unit, digital signal processor, etc.), and network interface controller onto a single chip. At the same time, such integrated circuit devices are also being driven at faster and faster clock frequencies. The combination of dense integration and faster clock frequencies has vastly reduced the timing margins of integrated circuit devices. Once an integrated circuit device has been fabricated and manufactured, failures and erroneous behavior due to timing violations can be hard to debug and difficult to resolve. As a result, timing verification of an integrated circuit design before tape out has become an integral part of the design cycle.

BRIEF DESCRIPTION OF THE DRAWINGS

Various embodiments in accordance with the present disclosure will be described with reference to the drawings, in which.

DETAILED DESCRIPTION

Chip designers are increasingly relying on outside vendors to provide specialized cores or integrated circuit blocks (also referred to as intellectual property (IP) blocks) to speed up the design cycle, and to design chips with functionalities that may be outside the expertise of the chip designer. For example, a processor manufacturer may build a chip that incorporates a processor that is designed in-house with a third-party memory block and a third-party network interface controller. These IP blocks from outside vendors are generally treated as black boxes that plug into the overall chip design. The third-party vendor is assumed to have properly performed timing verification of the IP block. However, this may not always be the case (e.g., due to incorrect modeling), and the IP blocks do not always meet timing requirements across operating conditions and process corners. Furthermore, some timing violations may manifest themselves only after being integrated into the overall chip design. For example, although an IP block may pass timing verification when timing analysis is performed on the stand-alone IP block, timing violations can still occur if an output of the IP block is driving a high fanout when incorporated into the overall chip design. Thus, even when a vendor represents an IP block as having passed timing verification, timing analysis should still be performed on the overall chip design.

For complex IP blocks, running dynamic simulations to check timing across operation conditions and process corners on the overall chip design can be extremely time consuming due to the slow runtime of the simulations. Thus, static timing analysis (STA) is preferable over dynamic simulations when verifying timing for complex designs. Although electronic design automation (EDA) tools have the capability to perform static timing analysis of complex designs, such tools are configured to operate on chips designed with a properly characterized standard library. Third-party IP blocks are typically provided as schematic netlists (e.g., Simulation Program with Integrated Circuit Emphasis (SPICE) netlists in circuit description language (cdl) format), and may not be readily mapped to a standard library. Although IP vendors may provide timing models of IP blocks, such timing models are typically limited to interface timing. As such, little is known about the timing and parasitic parameters of the internal components of the third-party IP blocks, and static timing analysis of signal paths involving the internal components of the third-party IP blocks can be difficult to perform using standard EDA tools.

The techniques disclosed herein provide a bridge between schematic netlists of third-party IP blocks and static timing analysis (STA) tools such that the timing of an integrated circuit design incorporating such IP blocks can be verified using STA tools. For the purpose of performing timing verification, the chip design can be modeled with a substitute integrated circuit design that replaces signal drivers of the transistor level extraction model with standard library components, and signal receivers of the transistor level extraction model with equivalent capacitors. Parasitic parameters of interconnects represented in the transistor level extraction model format are translated into a STA tool format, and static timing analysis can then be performed on the substitute integrated circuit design using the STA tool. Such techniques allow timing verification of third-party IP blocks incorporated into an integrated circuit design to be performed efficiently without having to fully characterize the third-party IP blocks.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Figure 1:
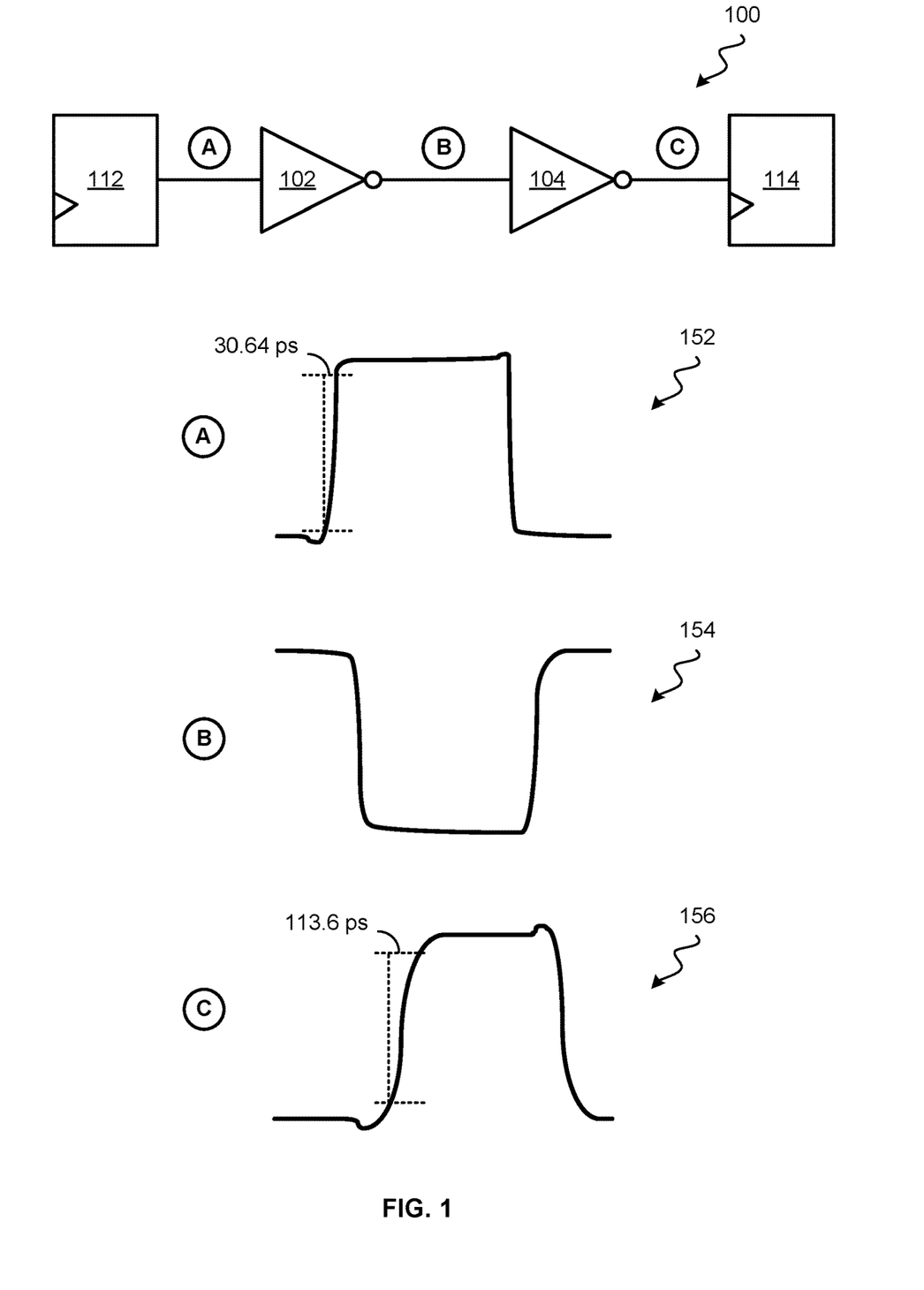
FIG. 1 illustrates an example of an integrated circuit that may be susceptible to a timing violation.

FIG. 1 illustrates an example of an integrated circuit 100 that may be susceptible to a timing violation. Integrated circuit 100 includes a first flip-flop 112 connected to a first inverter 102, which is coupled to a second inverter 104 connected to a second flip-flop 114. Integrated circuit 100 can be part of a bigger circuit block such as a multi-bit flip flop, and the multi-bit flip flop can be part of a more complex logic block such as a processor, accelerator, memory, network interface controller, or other application specific integrated circuits, etc. that is incorporated into a chip. The input signal of inverter 102 is represented as 'A'; the intermediate signal between inverter 102 and inverter 104 is represented as 'B'; and the output signal of inverter 104 is represented as 'C'.

Waveform 152 shows an example of an input pulse that is provided to inverter 102 from flip-flop 112. In waveform 152, the rising edge of input signal A to inverter 102 has a sharp transition, and the rising edge slew rate as measured between 10% and 90% of the full swing of the input signal A is 30.64 ps. Waveform 154 shows the intermediate signal B outputted from inverter 102. The output of inverter 102 is an inverted version of the input pulse. The falling edge of the intermediate signal B is slightly delayed from the rising edge of the input pulse due to the propagation delay through inverter 102. Waveform 156 shows the output signal C of inverter 104. The output signal C has the same polarity as the input pulse because of the two inverter stages, and the rising edge of output signal C is further delayed from the falling edge of the intermediate signal B due to the propagation delay through inverter 104.

As shown in FIG. 1, the rising edge slew rate as measured between 10% and 90% of the full swing of the output signal C is 113.6 ps. The rising edge slew rate of the output signal C is more than 3.5 times the slew rate of the input signal A. The signal degradation can be due to various factors such as large parasitic on the interconnect between inverters 102 and 104, high input capacitance of inverter 104, and/or low drive strength of inverter 102. If the integrated circuit design has a timing requirement of 60 ps maximum slew rate, then the timing violation of output signal C can cause the chip to function improperly. For example, a slow slew rate on the output of inverter 104 may cause flip-flop 114 to latch and store an incorrect value.

More generally, timing violations may occur in sequential elements (e.g., clocked components such as flip-flops, latches, clock gates, synchronous memories, etc.) due to, for example, insufficient set up time, hold time, etc. Timing violations may also occur in combinational elements (e.g., logic gates, adders, etc.) due to, for example, slow slew rates, etc. To ensure that an integrated circuit design is free of timing violations such as the one shown in FIG. 1 or any of these other types of timing violations, timing verification using static timing analysis (STA) can be performed on the overall integrated circuit design before tape out. Timing violations detected before tape out can be corrected, for example, by modifying the design to adjust transistor sizes to improve drive strength, adjust transistor sizes to reduce input capacitance, insert buffer stages to re-time signal paths, skew clock signals to borrow additional setup or hold times, etc. Once an integrated circuit device has taped out and put into production, the internal circuitry of the integrated circuit device cannot be changed easily. As such, timing violations discovered after tape out typically require a new design cycle to implement the fix and fabricate a new version of the chip. This can delay the time-to-market of the chip by months if timing verification is not adequately performed prior to tape out.

As mentioned above, third-party IP blocks are typically provided as schematic netlists such as SPICE cdl format. Static timing analysis tools such as Synopsys® PrimeTime are generally configured to perform timing verification based on standard library cells, and may not be readily compatible with schematic netlists from third-party vendors. As a result, performing static timing analysis on a chip that incorporates both circuit blocks designed in-house with standard library cells and IP blocks obtained from outside vendors can be challenging. One way to allow static timing analysis to be performed on an IP block is to fully characterized the IP block into the standard library. However, doing so on complex blocks is often impractical because characterizing each circuit in a complex IP block through dynamic simulations can take an extremely long time. In contrast, the techniques disclosed herein allows STA to be performed on components of a schematic netlist efficiently and effectively.

Figure 2:
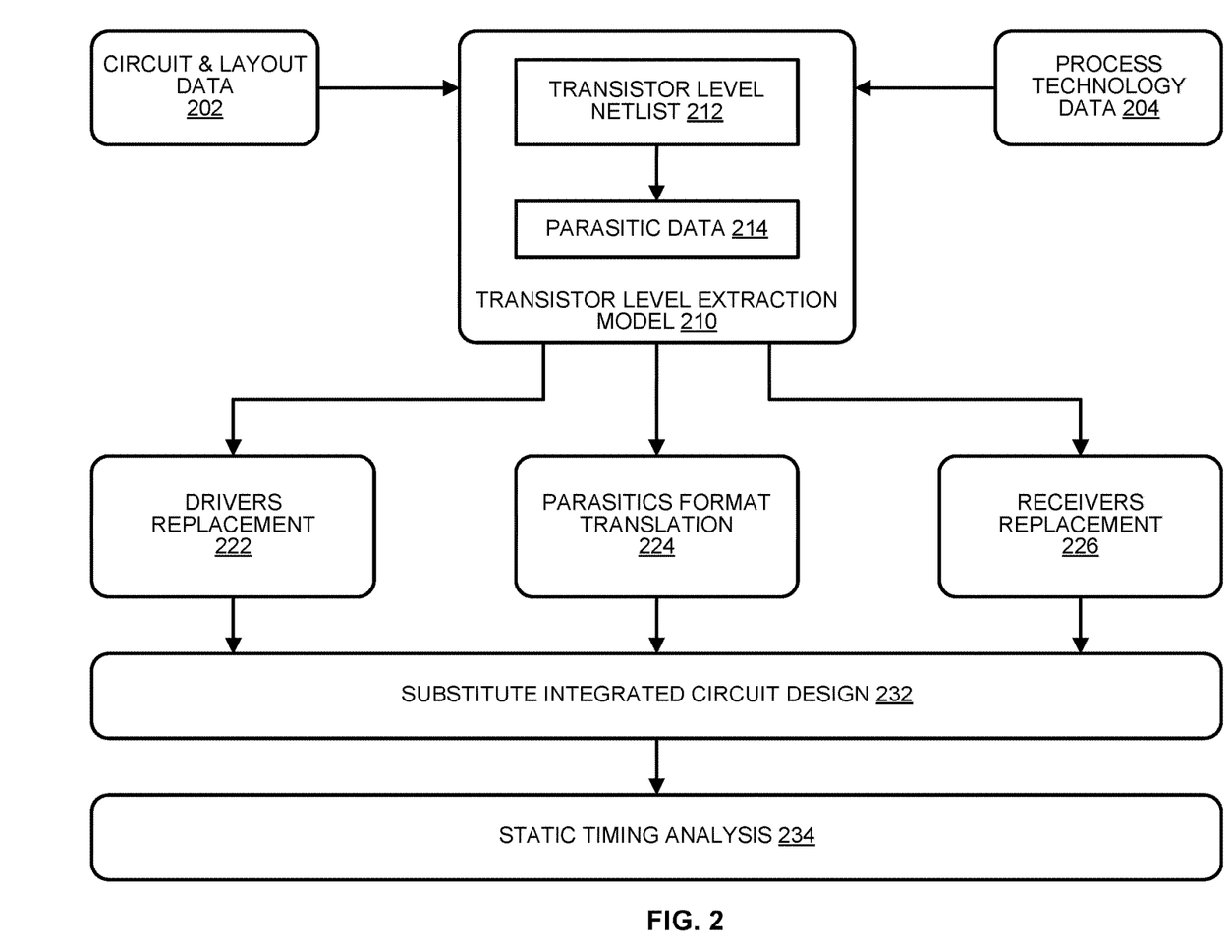
FIG. 2 illustrates a conceptual block diagram of a design flow leading up to static timing analysis.

FIG. 2 illustrates a conceptual block diagram of a design flow leading up to static timing analysis. The blocks at the top of FIG. 2 can be attributed to a third-party IP vendor. At block 202, the IP vendor designs the circuitry and layout of an IP block, and generates circuit and layout data for the IP block. The circuit design information can include a schematic netlist in the form of a circuit design language (cdl) file, and the layout information of the IP block can be in the form of a graphics design system (gds) file. At block 204, process technology information based on the fabrication process being used to manufacture the IP block is provided to the design flow. The process technology data may include design rules (e.g., minimum feature size supported by the process technology), and physical layer information.

At block 212, a transistor level extraction netlist representing the IP block is generated from the circuit/layout data and process technology data. At block 214, parasitic effects of the wiring interconnects in the IP block can be extracted from the transistor level extraction netlist. The parasitic data can be in the form of a Detailed Standard Parasitic Format (DSPF) file, which is a SPICE compatible format. The transistor level extraction netlist together with the parasitic data form the transistor level extraction model 210 of the IP block. The transistor level extraction model 210 allows dynamic simulations that reflect the actual timing of the IP block to be run. In some implementations, the IP vendor can provide both the transistor level extraction netlist and parasitic data to a chip designer incorporating the IP block into a chip design. In other implementations, the IP vendor may provide the schematic netlist of block 202, and the chip designer can extract the transistor level connectivity by performing a layout versus schematic (LVS) verification on the cdl and gds files using an integrated circuit verification tool (e.g., Synopsys IC Validator), and extracting the parasitic data using an extraction tool (e.g., Synopsys StarRC) to generate the transistor level extraction model 210 of the IP block.

Upon obtaining the transistor level extraction model 210, the IP block can be incorporated into a larger integrated circuit design that contains other blocks designed with a standard library. Static timing analysis (STA) tools are typically configured to operate on standard library cells. As such, to perform static timing analysis on an integrated circuit design containing a transistor level extraction model of an IP block, the integrated circuit design is first converted into a substitute integrated circuit design that is compatible with the static timing analysis (STA) tool. The substitute integrated circuit design may replace circuitry and timing information from the transistor level extraction model 210 with standard library information that the STA tool can operate on.

Signal paths in the integrated circuit design that have one or more components in the IP block can be identified. Such a signal path may include a driver circuit, a receiver circuit, and an interconnect that couples the output signal of the driver circuit to the receiver circuit. The signal path can be used to carry a clock signal or a data signal. Upon identifying such signal paths in the integrated circuit design, components of the signal paths in the IP block can be replaced with standard library information to generate the substitute integrate circuit design. For example, at block 222, signal drivers in the IP block can be replaced with primitive standard library cells (e.g., buffer, inverter, NAND gate, NOR gate, etc.) that have similar drive strengths. The primitive standard library cell is selected based on the similarity of drive strength to the signal driver being replaced, and thus whether the primitive standard library cell has a single input (e.g., as in the case of a buffer or inverter) or has multiple inputs (e.g., as in the case of a NAND or NOR gate) is not critical. At block 226, signal receivers in the IP block can be replaced with equivalent capacitors. Furthermore, at block 224, the parasitic parameters of the interconnects from the transistor level extraction model 210 can be translated into a format compatible with the STA tool. For example, the parasitic information from the DSPF file can be translated into a Standard Parasitic Exchange Format (SPEF) file format for use with the STA tool.

The replacement components and translated parasitic parameters can be stitched back together with the other standard library circuit blocks of the overall chip design to generate a substitute integrated circuit design 232. By replacing drivers and receivers respectively with primitive standard library cells and equivalent capacitors in the substitute integrated circuit design 232 and providing parasitic information in a compatible format, the STA tool can readily perform static timing analysis at block 234 on the substitute integrated circuit design to determine whether the propagation delay of the signal path satisfies a timing requirement (e.g., a timing constraint that the propagation delay should be less than a certain amount of time). A propagation delay that does not satisfy the timing requirement may cause a timing violation in the integrated circuit device. The technique described above allows the static timing analysis to be performed on signal paths of interest without having to perform full characterization of the IP block.

Figure 3:
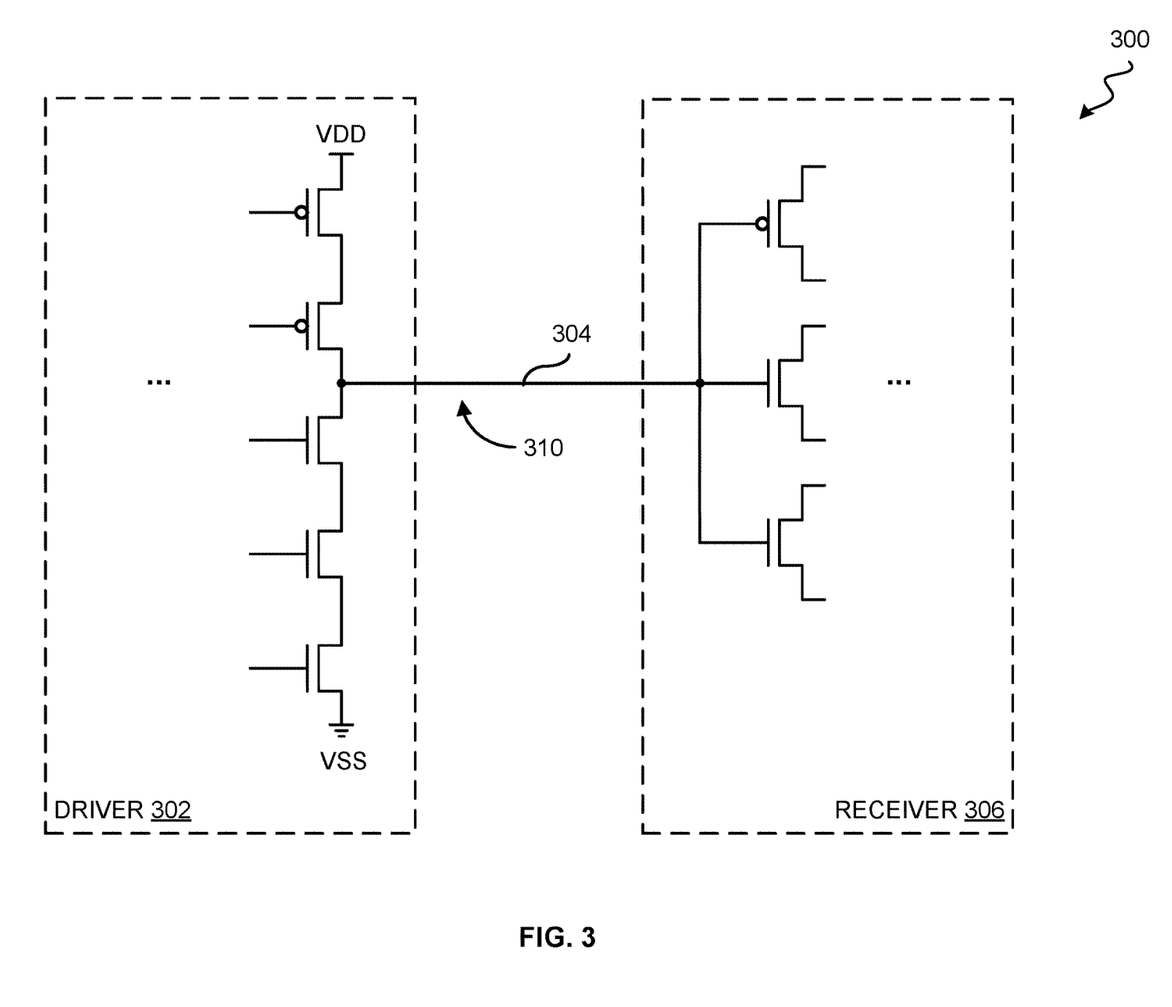
FIG. 3 illustrates an example of a signal path than can be implemented as part of an integrated circuit design.

FIG. 3 illustrates an example of a signal path 300 than can be implemented as part of an integrated circuit design. Signal path 300 includes a driver circuit 302 that provides a signal 310 via an interconnect 304 to a receiver circuit 306, and can be used to implement a clock path or a datapath. It should be understood that an integrated circuit design may include thousands and even millions of signal paths having a driver circuit coupled to a receiver circuit via an interconnect. Generally, a driver circuit can be identified as a circuit having a set of one or more transistors connected from ground (e.g., VSS) to a power supply (e.g., VDD), and a receiver circuit can be identified as a set of one of more transistors whose transistor gate is driven by the output signal of a driver circuit. For the purpose of static timing analysis, the logic function of the circuitry generating the signal 310 being driven by the driver circuit 302 is not critical to the timing analysis of signal path 300. Similarly, the logic function of the circuitry following the receiver stage is not critical to the timing analysis of signal path 300. As such, the circuitry preceding the driver stage and the circuitry following the receiver stage are not shown in FIG. 3.

In the particular example of FIG. 3, driver circuit 302 includes two PMOS transistors coupled in series followed by 3 NMOS transistors coupled in series. Receiver circuit 306 includes one PMOS transistor and two NMOS transistors that have their transistor gates driven by the output of driver circuit 302. It should be understood that the driver circuit of a signal path can include any number of PMOS and/or NMOS transistors, and similarly, the receiver circuit of a signal path can include any number of PMOS and/or NMOS transistors being driven by the output of the driver circuit. One or more components of signal path 300 may reside in an IP block and can be represented as part of a transistor level extraction model generated from a schematic netlist (e.g., in SPICE cdl format). Different variations of implementing the signal path in an integrated circuit chip design are shown in FIGS. 4-7.

Figure 4:
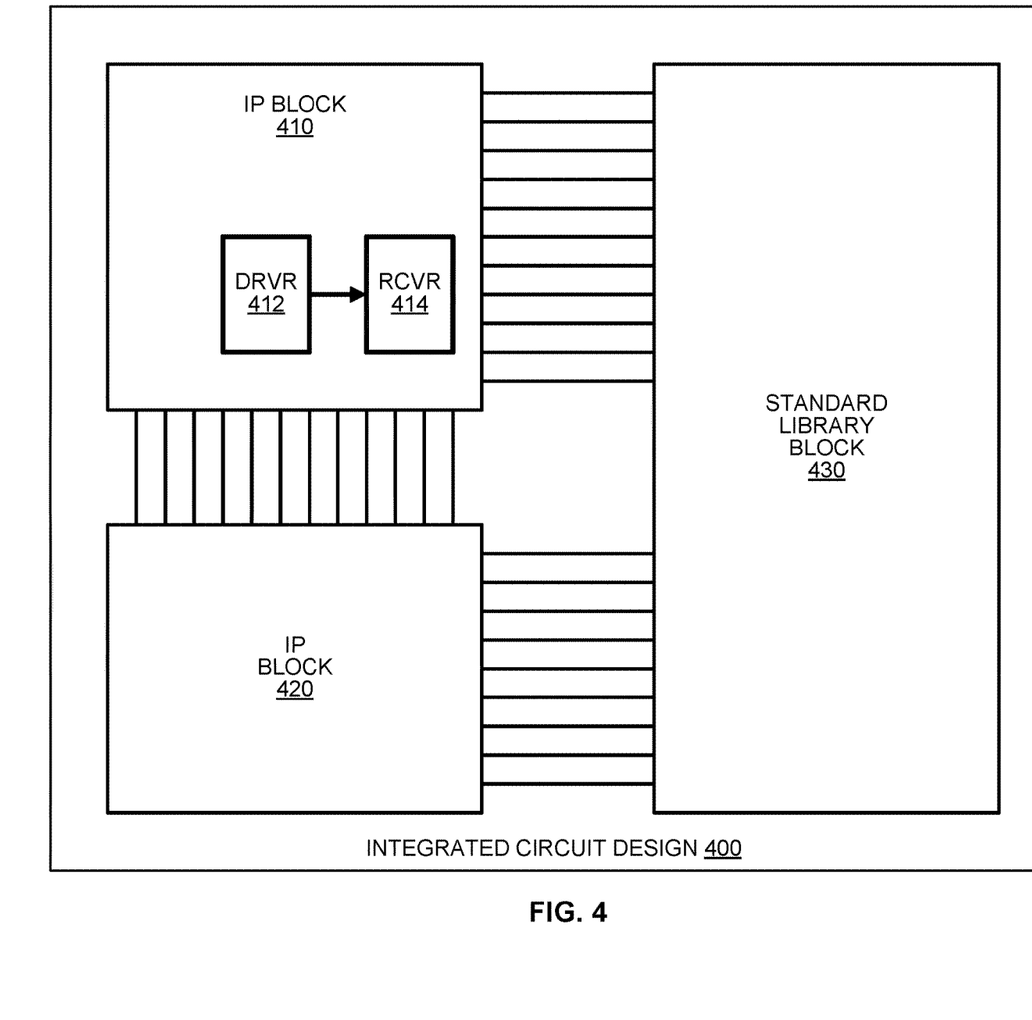
FIG. 4 illustrates an example of an integrated circuit design having multiple circuit blocks.

FIG. 4 illustrates an example of an integrated circuit design 400 having multiple circuit blocks. Integrated circuit design 400 may include a first IP block 410, a second IP block 420, and a standard library block 430. For example, IP block 410 can be a network interface controller, IP block 420 can be a peripheral bus subsystem, and standard library block 430 can be a multiprocessor core. It should be understood that these circuit blocks are just examples, and that the integrated circuit designs of FIGS. 4-7 can have any number of IP blocks and/or standard library blocks, and any of such blocks can perform a function not specifically described. As shown in FIG. 4, integrated circuit design 400 may include a signal path that resides entirely in IP block 410. The signal path shown in integrated circuit design 400 includes a driver 412 that outputs a signal to a receiver 414. Both the driver 412 and the receiver 414, as well as the interconnect coupling driver 412 to receiver 414 are part of IP block 410. As such, the driver 412, the receiver 414, and the parasitic parameters of the interconnect can be represented as part of a transistor level extraction model.

Figure 5:
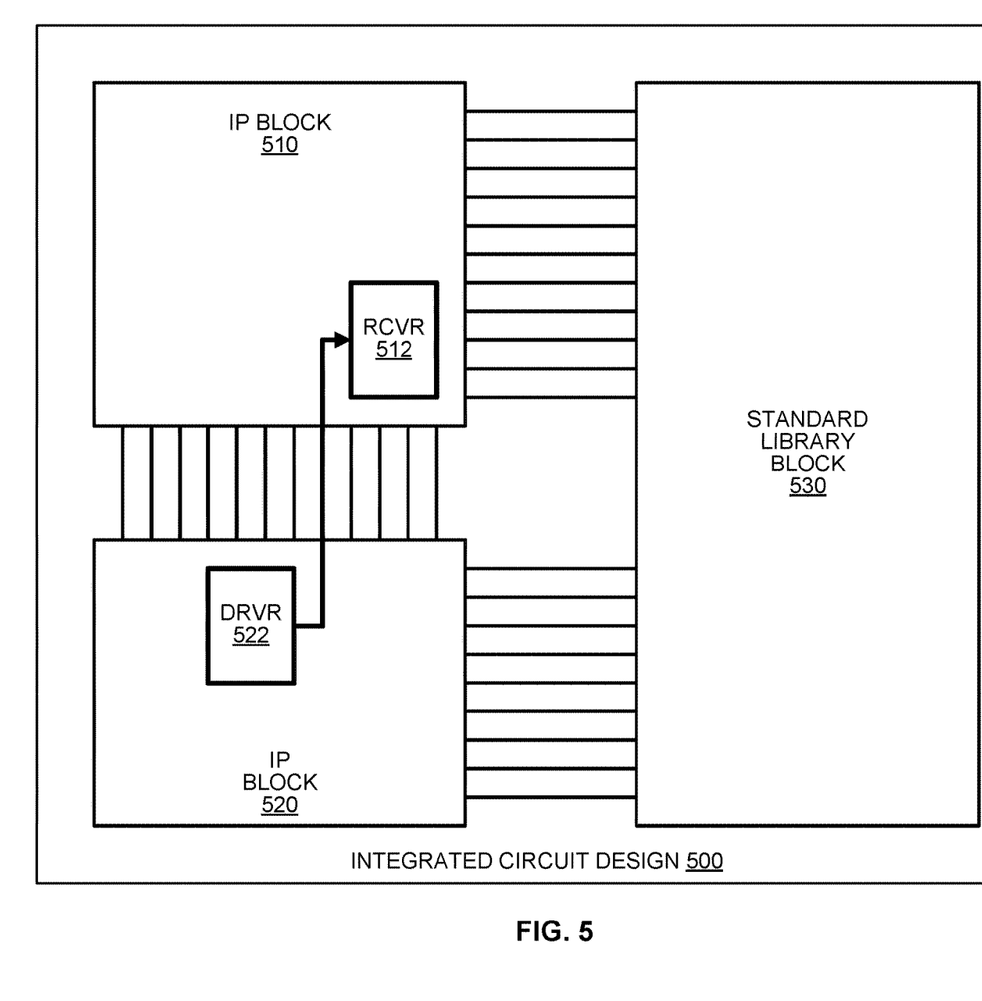
FIG. 5 illustrates another example of an integrated circuit design having multiple circuit blocks.

FIG. 5 illustrates another example of an integrated circuit design 500 having multiple circuit blocks. Integrated circuit design 500 may include a first IP block 510, a second IP block 520, and a standard library block 530. As shown in FIG. 5, integrated circuit design 500 may include a signal path that spans IP block 510 and IP block 520. IP block 510 and IP block 520 can be from the same or different IP vendors. The signal path shown in integrated circuit design 500 includes a driver 522 in IP block 520 that outputs a signal to a receiver 512 in IP block 510. Driver 522 can be represented as part of a transistor level extraction model of IP block 520, and receiver 512 can be represented as part of a transistor level extraction model of IP block 510. The parasitic parameters of the interconnect coupling driver 522 and receiver 512 can be represented in the transistor level extraction model of IP block 520, and/or in the transistor level extraction model of IP block 510.

Figure 6:
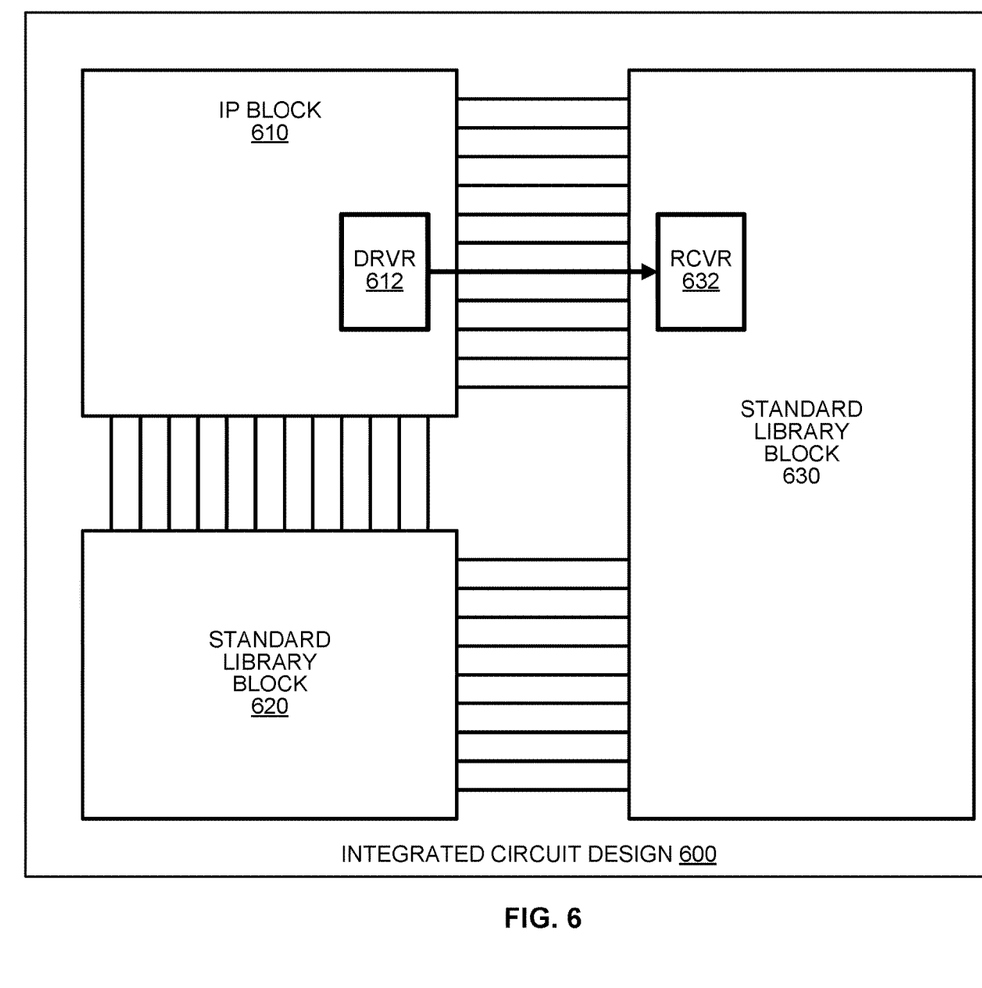
FIG. 6 illustrates a further example of an integrated circuit design having multiple circuit blocks.

FIG. 6 illustrates a further example of an integrated circuit design 600 having multiple circuit blocks. Integrated circuit design 600 may include an IP block 610, a first standard library block 620, and a second standard library block 630. As shown in FIG. 6, integrated circuit design 600 may include a signal path that spans IP block 610 and standard library block 620. The signal path shown in integrated circuit design 600 includes a driver 612 in IP block 610 that outputs a signal to a receiver 632 in standard library block 630. Driver 612 can be represented as part of a transistor level extraction model of IP block 610, and receiver 632 can be implemented using standard library cells in standard library block 630. The parasitic parameters of the interconnect coupling driver 612 and receiver 632 can be represented in the transistor level extraction model of IP block 610, and/or represented as part of standard library block 630.

Figure 7:
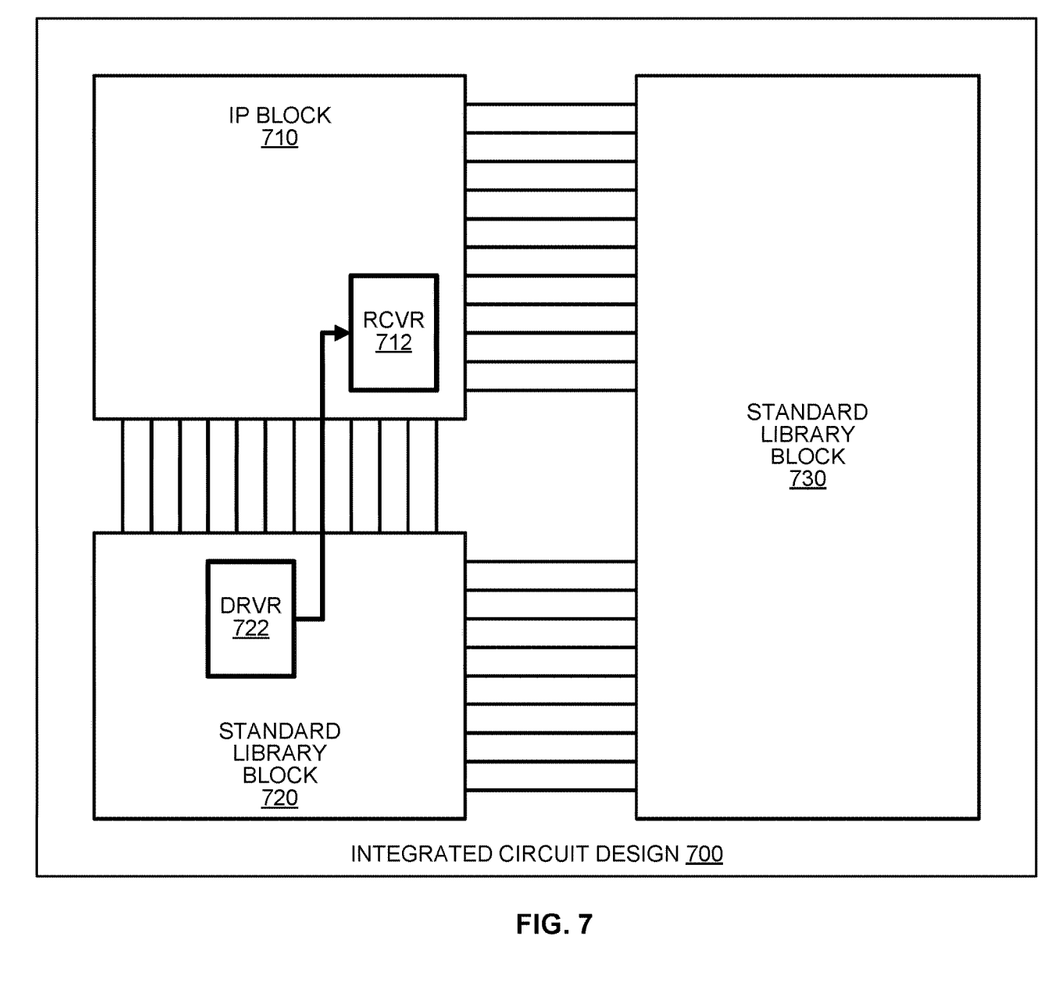
FIG. 7 illustrates an additional example of an integrated circuit design having multiple circuit blocks.

FIG. 7 illustrates an additional example of an integrated circuit design 700 having multiple circuit blocks. Integrated circuit design 700 may include an IP block 710, a first standard library block 720, and a second standard library block 730. As shown in FIG. 7, integrated circuit design 700 may include a signal path that spans standard library block 720 and IP block 710. The signal path shown in integrated circuit design 700 includes a driver 722 in standard library block 720 that outputs a signal to a receiver 712 in IP block 710. Driver 722 can be implemented using standard library cells of standard library block 720, and receiver 712 can be represented as part of the transistor level extraction model of IP block 710. The parasitic parameters of the interconnect coupling driver 722 and receiver 712 can be represented as part of standard library block 720 and/or in the transistor level extraction model of IP block 710.

As shown in FIGS. 4-7, a signal path that includes a driver, an interconnect, and a receiver can have one or more components residing in an IP block. An integrated circuit design can have any number of such signal paths, and such signal paths can include any combination of the different variations of the signal paths shown in FIGS. 4-7. The techniques disclosed herein can be used to replace components represented using a transistor level extraction model such that a STA tool can perform static timing analysis on the integrated circuit design containing an IP block from a third-party vendor.

Figure 8:
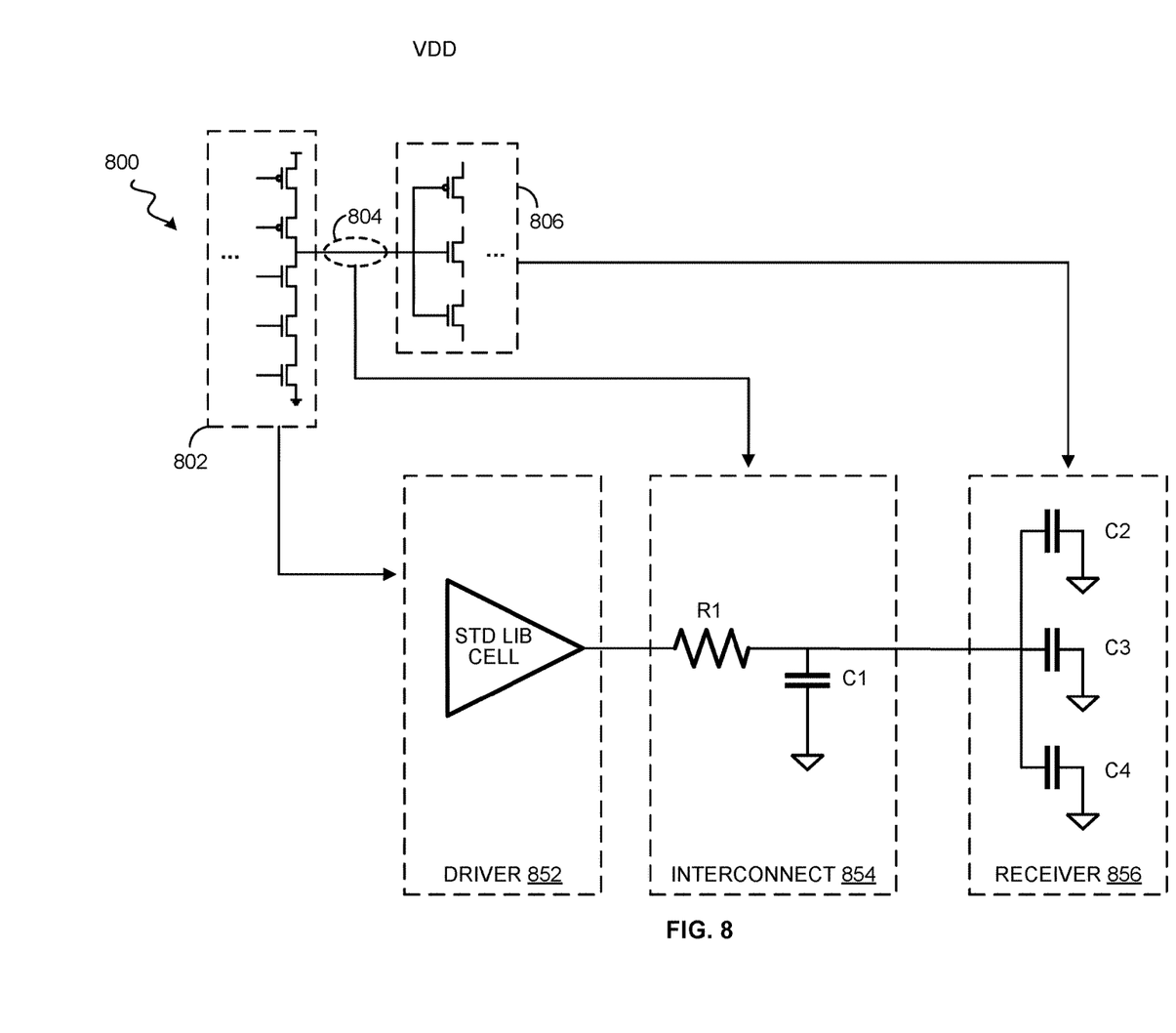
FIG. 8 illustrates an example of a signal path of an integrated circuit design being substituted with components for static timing analysis.

FIG. 8 illustrates an example of a signal path 800 of an integrated circuit design being substituted with components for static timing analysis. Signal path 800 can be part of an IP block and thus can be represented using a transistor level extraction model generated from a schematic netlist (e.g., a SPICE cdl format) with wiring parasitic information represented in a DSPF file. Signal path 800 includes a driver circuit 802, an interconnect 804, and a receiver circuit 806. Signal path 800 is similar to signal path 300, and thus a detailed description of which need not be repeated.

To perform static timing analysis on signal path 800 using a STA tool that is configured to operate on a standard library, driver circuit 802 can be replaced with a driver component 852 that includes a primitive standard library cell selected from the standard library of the integrated circuit design. The primitive standard library cell can be, for example, a buffer as shown, an inverter, a NAND gate, or a NOR gate. The primitive standard library cell replacing driver circuit 802 is selected based on a similarity of drive strengths between the primitive standard library cell and driver circuit 802. The particular logic function of driver circuit 802 is not critical to static timing analysis, and thus the primitive standard library cell can be selected based on the drive strength and not the logic function of the cell.

The drive strength of driver circuit 802 can be determined by the transistor gate sizes of the set of transistors of the driver stage connected from ground (e.g., VSS) to a power supply (e.g., VDD). Generally, transistor gate sizes are expressed as width over the unit length of the process technology, and the width of the transistor gates are readily available from the transistor level extraction model. Thus, referring to FIG. 8, the drive strength of driver circuit 802 can be determined by the effective transistor gate widths of the two PMOS transistors, and the effective transistor gate widths of the three NMOS transistors connected in series. In some implementations, the drive strength of driver circuit 802 can be determined by executing a characterization tool (e.g., Synopsys SiliconSmart) on driver circuit 802.

Ideally, the primitive standard library cell selected to replace driver circuit 802 has the same drive strength as driver circuit 802. However, depending on the implementation of driver circuit 802, the standard library may not contain a primitive cell that matches the drive strength of driver circuit 802. Thus, there can be instances in which the primitive standard library cell replacing driver circuit 802 has a different drive strength than driver circuit 802. In such scenarios, the primitive standard library cell having the closest drive strength to driver circuit 802 can be selected as the replacement for driver circuit 802. In some implementations, for a more conservative timing analysis, the primitive standard library cell having the closest drive strength that is less than driver circuit 802 can be selected as the replacement for driver circuit 802.

To account for the wiring propagation delay, the parasitic parameters of interconnect 804 are translated from the transistor level extraction model into a format compatible with the STA tool. For example, the parasitic parameters of the transistor level extraction model can be provided in a Detailed Standard Parasitic Format (DSPF). DSPF provides parasitic resistance(s) and capacitance(s) of each interconnect in transistor level extraction model using SPICE syntax. However, such a format may not be compatible with a STA tool that uses a Standard Parasitic Exchange Format (SPEF) for parasitic modeling. Accordingly, the parasitic resistance and capacitance values can be translated from DSPF to SPEF to allow the STA tool to properly model the interconnect. A SPEF file has separate sections for connections, capacitances, and resistances. As such, translating the parasitic parameters from DSPF to SPEF may involve placing the interconnect name in the proper syntax in the connections section of a SPEF file, and placing the interconnect's parasitic capacitance(s) and resistance(s) as identified by the interconnect name into the corresponding sections of the SPEF file. Although a single RC circuit (resistor R1 and capacitor C1) is shown as the parasitic parameters of interconnect 854 in FIG. 8, it should be understood that the parasitic parameters of an interconnect can include a RC network having multiple RC circuits.

In addition to replacing the driver circuit 802, the receiver circuit 806 can also be replaced with a receiver component 856. Receiver component 856 includes an equivalent capacitor for each transistor of the receiver circuit 806 having a transistor gate driven by interconnect 804. Referring to the example shown in FIG. 8, receiver circuit 806 includes three transistors having a transistor gate that is driven by interconnect 806. Thus, receiver component 856 includes three capacitors C2, C3, and C4 to replace the three transistors of receiver circuit 806. Capacitor C2 has a capacitance that is equivalent to the input capacitance of the PMOS transistor of receiver circuit 806. Capacitor C3 has a capacitance that is equivalent to the input capacitance of the middle NMOS transistor of receiver circuit 806. Capacitor C4 has a capacitance that is equivalent to the input capacitance of the bottom NMOS transistor of receiver circuit 806.

In some implementations, the input capacitances of the transistors of receiver circuit 806 may not be readily available from the transistor level extraction model. To obtain the input capacitances of the transistors of receiver circuit 806, a standard library characterization tool (e.g., Synopsys SiliconSmart) can be executed on each individual transistor of receiver circuit 806. Such characterization tool can simulate each individual transistor by inputting a pulse signal to the gate of the transistor while the source and drain nodes are tied together, and calculating the average current around a rising and falling transition over a specified period of time. Characterizing individual transistors can be performed relatively quickly as compared to characterizing an entire IP block. As such, even though some characterization of the IP block is performed for individual transistors, the overall setup to generate the substitute integrated circuit design for static timing analysis can be performed in significantly less time than full characterization of a complex IP block.

The technique shown in FIG. 8 for replacing a signal path with components compatible with a STA tool can be performed for any number of signal paths of an IP block. If only a portion of the signal path is in the IP block, then only the component in the IP block may need to be replaced. For example, if a driver in an IP block is driving a signal for a receiver in a standard library block, then only the driver may need to be replaced with a primitive standard library cell because the input capacitance of the receiver can be readily available from the standard library. Likewise, if a driver in a standard library block is driving a signal for a receiver in an IP block, then only the receiver may need to be replaced with equivalent capacitances because the drive strength of the driver can be readily available from the standard library. Upon generating the substitute integrated circuit design by replacing components represented as a transaction level extraction model in the IP block, the STA tool can be executed to perform static timing analysis on the substitute integrated circuit design to determine whether the integrated circuit design contains any timing violations.

Figure 9:
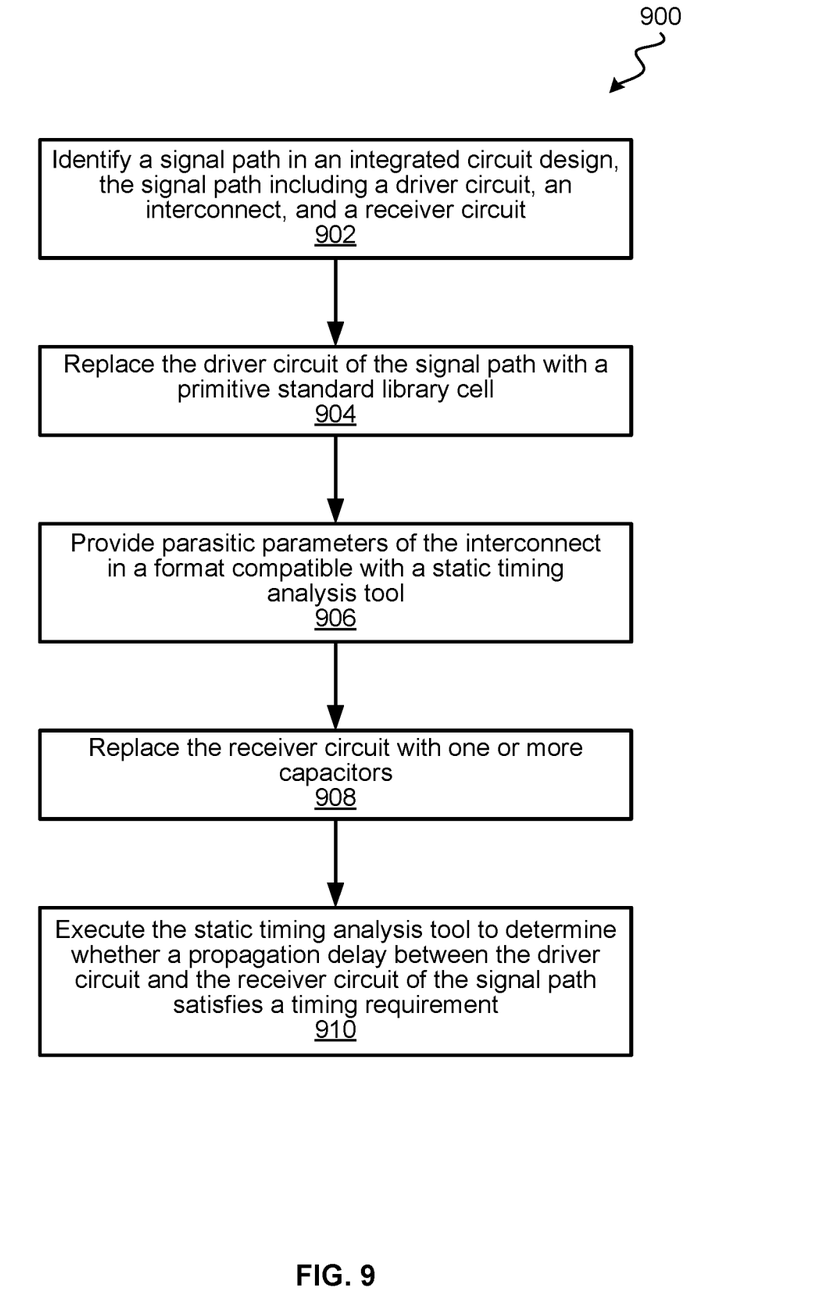
FIG. 9 illustrates an example of a flow diagram of a process for preparing an integrated circuit design for static timing analysis.

FIG. 9 illustrates a flow diagram of an example of a process 900 for preparing an integrated circuit design for static timing analysis. Process 900 can be implemented as instructions or commands in a non-transitory computer-readable medium (e.g., an execution script), which can be executed by a computing system to verify the timing of an integrated circuit design. In some implementations, the integrated circuit design may include a combination of standard library block(s) and IP block(s) obtained from third-party IP vendors.

Process 900 may begin at block 902 by identifying a signal path in an integrated circuit design. The signal path may include a driver circuit, an interconnect, and a receiver circuit. The driver circuit can be identified as a set of one or more transistors connected between ground (e.g., VSS) and power (e.g., VDD) that produces a signal being fed to a transistor gate. The receiver circuit can be identified as a set of one or more transistors whose transistor gate is driven by the output of the driver circuit. The interconnect can be identified as the wiring that couples the output of the driver circuit to the receiver circuit. One or more of the driver circuit, interconnect, or receiver circuit can be part of an integrated circuit block (e.g., an IP block) represented as a transistor level extraction model or a schematic netlist (e.g., SPICE cdl format).

At block 904, a substitute integrated circuit design suitable for a static timing analysis (STA) tool can be generated by replacing the driver circuit of the signal path with a primitive standard library cell. The primitive standard library cell can be, for example, a buffer, an inverter, a NAND gate, or a NOR gate of the standard library. The primitive standard library cell to replace the driver circuit can be selected based on the drive strength of the driver circuit. In some implementations, the primitive standard library cell replacing the driver circuit can have the same drive strength as the driver circuit. If such a primitive cell is not available in the standard library, a primitive standard library cell having the closest drive strength to the driver circuit, or the closest drive strength that is less than that of the driver circuit can be selected.

At block 906, parasitic parameters of the interconnect of the signal path are provided in a format compatible with a static timing analysis tool. The parasitic parameters of the interconnect may include a RC circuit having a resistor and a capacitor. The parasitic parameters of the interconnect may also include a RC network with a series of RC circuits. In some implementations, providing the parasitic parameters of the interconnect may include translating the parasitic parameters from the transistor level extraction model to the format compatible with the static timing analysis tool such as translating the parasitic parameters from a Detailed Standard Parasitic Format (DSPF) to a Standard Parasitic Exchange Format (SPEF).

At block 908, the receiver circuit of the signal path is replaced with one or more capacitors. Each transistor of the receiver circuit that has a transistor gate being driven by the interconnect can be replaced with a corresponding capacitor. The replacement capacitor has a capacitance value that is equivalent to that of the input capacitance of the transistor. As such, block 908 may involve determining an equivalent capacitance for each transistor of the receiver circuit having a transistor gate driven by the interconnect. In some implementations, determining the equivalent capacitance of each transistor may include executing a standard library characterization tool on each transistor individually to obtain the input capacitance of the corresponding transistor. The process of replacing components of a signal path for STA analysis can be repeated for any number of signal paths of interest in the integrated circuit design to generate the substitute integrate circuit design.

At block 910, the static timing analysis tool is executed on the substitute integrated circuit design to determine whether the propagation delay of the signal paths satisfies a timing requirement or constraint of the integrated circuit design. For example, the integrated circuit design including the replaced components can be represented using standard library cells in a set of one or more Verilog files, and the set of one or more Verilog files and a SPEF file modeling the parasitic parameters of the interconnects of the design can be provided to a STA tool. The STA tool can then analyze the design, and generate a timing report with information on the critical paths of the design and whether any timing constraints are not met in the design. Timing violations detected by the STA tool can be fixed before tape out to ensure the post-production chip will meet the timing requirements of the design.

Figure 10:
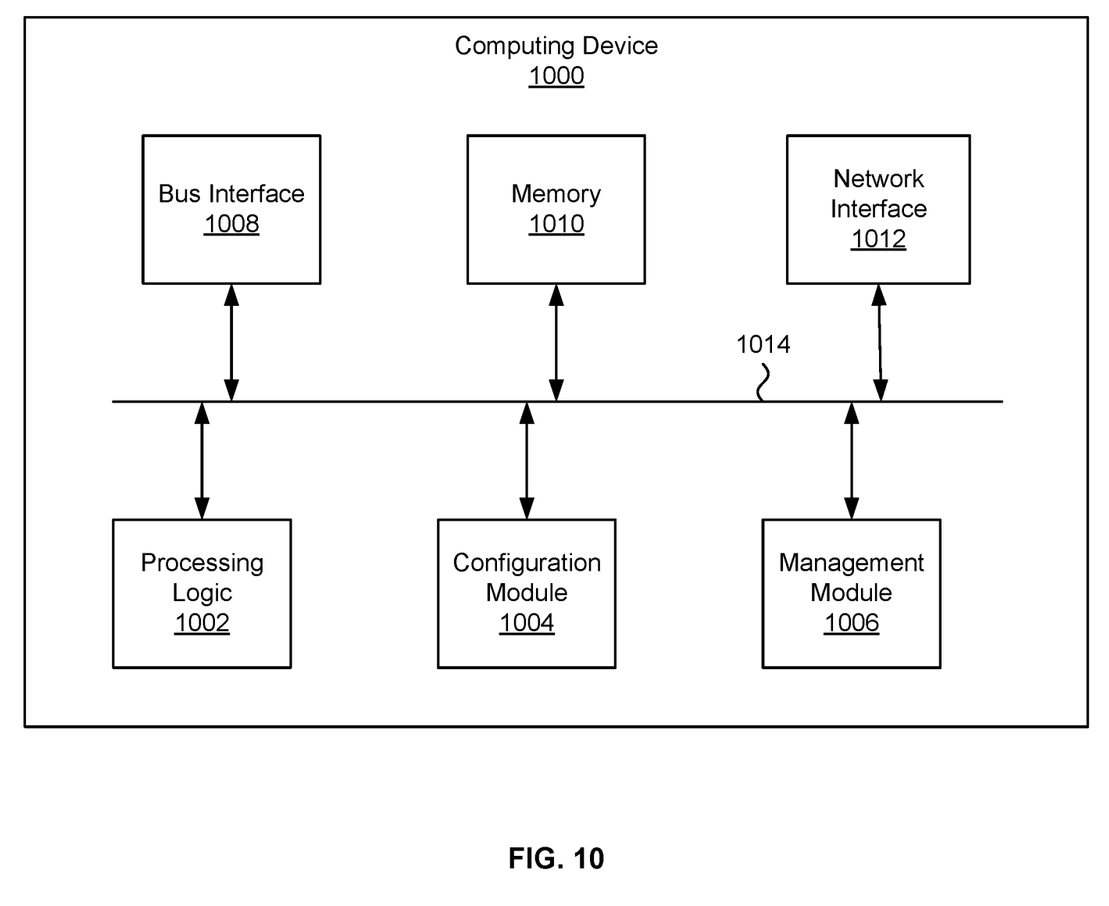
FIG. 10 illustrates an example of a computing device, according to certain aspects of the disclosure.

FIG. 10 illustrates an example of a computing device 1000. Functionality and/or several components of the computing device 1000 may be used without limitation with other embodiments disclosed elsewhere in this disclosure, without limitations. A computing device 1000 may facilitate processing of data and/or forwarding of data from the computing device 1000 to another device. Computing device 1000 can be used to perform, for example, process 900. In another context, the techniques for performing static timing analysis described herein can be applied to one or more components of computing device 1000 during the design cycle of such components.

In one example, the computing device 1000 may include processing logic 1002, a configuration module 1004, a management module 1006, a bus interface module 1008, memory 1010, and a network interface module 1012. These modules may be hardware modules, software modules, or a combination of hardware and software. In certain instances, modules may be interchangeably used with components or engines, without deviating from the scope of the disclosure. The computing device 1000 may include additional modules, not illustrated here. In some implementations, the computing device 1000 may include fewer modules. In some implementations, one or more of the modules may be combined into one module. One or more of the modules may be in communication with each other over a communication channel 1014. The communication channel 1014 may include one or more busses, meshes, matrices, fabrics, a combination of these communication channels, or some other suitable communication channel.

The processing logic 1002 may include application specific integrated circuits (ASICs), field programmable gate arrays (FPGAs), systems-on-chip (SoCs), network processing units (NPUs), processors configured to execute instructions or any other circuitry configured to perform logical arithmetic and floating-point operations. Examples of processors that may be included in the processing logic 1002 may include processors developed by ARM®, MIPS®, AMID®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1002 may be stored on a computer-readable storage medium, for example, in the form of a computer program. The computer-readable storage medium may be non-transitory. In some cases, the computer-readable medium may be part of the memory 1010.

The memory 1010 may include either volatile or non-volatile, or both volatile and non-volatile types of memory. The memory 1010 may, for example, include random access memory (RAM), read only memory (ROM), Electrically Erasable Programmable Read-Only Memory (EEPROM), flash memory, and/or some other suitable storage media. In some cases, some or all of the memory 1010 may be internal to the computing device 1000, while in other cases some or all of the memory may be external to the computing device 1000. The memory 1010 may store an operating system comprising executable instructions that, when executed by the processing logic 1002, provides the execution environment for executing instructions providing networking functionality for the computing device 1000. The memory may also store and maintain several data structures and routing tables for facilitating the functionality of the computing device 1000.

In some implementations, the configuration module 1004 may include one or more configuration registers. Configuration registers may control the operations of the computing device 1000. In some implementations, one or more bits in the configuration register can represent certain capabilities of the computing device 1000. Configuration registers may be programmed by instructions executing in the processing logic 1002, and/or by an external entity, such as a host device, an operating system executing on a host device, and/or a remote device. The configuration module 1004 may further include hardware and/or software that control the operations of the computing device 1000.

In some implementations, the management module 1006 may be configured to manage different components of the computing device 1000. In some cases, the management module 1006 may configure one or more bits in one or more configuration registers at power up, to enable or disable certain capabilities of the computing device 1000. In certain implementations, the management module 1006 may use processing resources from the processing logic 1002. In other implementations, the management module 1006 may have processing logic similar to the processing logic 1002, but segmented away or implemented on a different power plane than the processing logic 1002.

The bus interface module 1008 may enable communication with external entities, such as a host device and/or other components in a computing system, over an external communication medium. The bus interface module 1008 may include a physical interface for connecting to a cable, socket, port, or other connection to the external communication medium. The bus interface module 1008 may further include hardware and/or software to manage incoming and outgoing transactions. The bus interface module 1008 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1008 may include the physical layer for any of these bus protocols, including a connector, power management, and error handling, among other things. In some implementations, the computing device 1000 may include multiple bus interface modules for communicating with multiple external entities. These multiple bus interface modules may implement the same local bus protocol, different local bus protocols, or a combination of the same and different bus protocols.

The network interface module 1012 may include hardware and/or software for communicating with a network. This network interface module 1012 may, for example, include physical connectors or physical ports for wired connection to a network, and/or antennas for wireless communication to a network. The network interface module 1012 may further include hardware and/or software configured to implement a network protocol stack. The network interface module 1012 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 1000 may include multiple network interface modules, each configured to communicate with a different network. For example, in these implementations, the computing device 1000 may include a network interface module for communicating with a wired Ethernet network, a wireless 802.11 network, a cellular network, an Infiniband network, etc.

The various components and modules of the computing device 1000, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 10, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method comprising:
   obtaining a transistor level extraction model of an integrated circuit block;
   incorporating the integrated circuit block into an integrated circuit design;
   identifying a signal path in the integrated circuit design having a component in the integrated circuit block, the signal path including a driver circuit, an interconnect, and a receiver circuit;
   generating a substitute integrated circuit design by:
      replacing the driver circuit of the signal path with a primitive standard library cell of a standard library of the integrated circuit design;
      replacing the receiver circuit with one or more capacitors; and
      translating parasitic parameters of the interconnect in the transistor level extraction model into a format for a static timing analysis tool; and
   executing the static timing analysis tool on the substitute integrated circuit design to determine whether a propagation delay from the driver circuit to the receiver circuit of the signal path satisfies a timing requirement of the integrated circuit design.

2. The method of claim 1, wherein the primitive standard library cell is one of a buffer, an inverter, a NAND gate, or a NOR gate of the standard library.

3. The method of claim 1, wherein translating the parasitic parameters includes translating the parasitic parameters from a Detailed Standard Parasitic Format (DSPF) to a Standard Parasitic Exchange Format (SPEF).

4. The method of claim 1, wherein replacing the receiver circuit includes replacing a plurality of transistors of the receiver circuit that have a transistor gate being driven by the interconnect, each of the plurality of transistors being replaced with a corresponding equivalent capacitor.

5. A method comprising:
   identifying a signal path in an integrated circuit design, the signal path including a driver circuit, an interconnect, and a receiver circuit;
   generating a substitute integrated circuit design by:
      replacing the driver circuit of the signal path with a primitive standard library cell;
      providing parasitic parameters of the interconnect in a format compatible with a static timing analysis tool; and
      replacing the receiver circuit with one or more capacitors; and
   executing the static timing analysis tool on the substitute integrated circuit design to determine whether a propagation delay from the driver circuit to the receiver circuit of the signal path satisfies a timing requirement of the integrated circuit design.

6. The method of claim 5, wherein the driver circuit is part of an integrated circuit block represented as a transistor level extraction model generated from a schematic netlist.

7. The method of claim 6, wherein the schematic netlist is in a Simulation Program with Integrated Circuit Emphasis (SPICE) format.

8. The method of claim 5, wherein the primitive standard library cell is a buffer, an inverter, a NAND gate, or a NOR gate of a standard library.

9. The method of claim 5, further comprising selecting, from a standard library, the primitive standard library cell having a same drive strength as the driver circuit.

10. The method of claim 5, further comprising selecting, from a standard library, the primitive standard library cell having a closest drive strength to the driver circuit.

11. The method of claim 5, further comprising selecting, from a standard library, the primitive standard library cell having a closest drive strength that is less than a drive strength of the driver circuit.

12. The method of claim 5, wherein the parasitic parameters include a resistance and a capacitance of the interconnect.

13. The method of claim 5, wherein providing the parasitic parameters of the interconnect includes translating the parasitic parameters from a transistor level extraction model to the format compatible with the static timing analysis tool.

14. The method of claim 13, wherein translating the parasitic parameters includes translating the parasitic parameters from a Detailed Standard Parasitic Format (DSPF) to a Standard Parasitic Exchange Format (SPEF).

15. The method of claim 5, wherein the receiver circuit is part of an integrated circuit block represented as a transistor level extraction model generated from a schematic netlist.

16. The method of claim 15, further comprising:
for each transistor of the receiver circuit having a transistor gate driven by the interconnect, determining an equivalent capacitance of the transistor.

17. The method of claim 16, wherein determining the equivalent capacitance of each transistor includes executing a standard library characterization tool on each transistor individually.

18. A non-transitory computer-readable medium storing code which, when executed by one or more processors, causes the one or more processors to perform operations including:
identifying a signal path in an integrated circuit design, the signal path including a driver circuit, an interconnect, and a receiver circuit;
generating a substitute integrated circuit design by:
replacing the driver circuit of the signal path with a primitive standard library cell of a standard library having a closest drive strength as the driver circuit;
providing parasitic parameters of the interconnect in a format compatible with a static timing analysis tool; and
replacing a transistor of the receiver circuit with a capacitor having an equivalent capacitance; and
executing the static timing analysis tool on the substitute integrated circuit design to determine whether the signal path contains a timing violation.

19. The non-transitory computer-readable medium of claim 18, wherein at least one of the driver circuit or the receiver circuit is part of an integrated circuit block represented as a transistor level extraction model generated from a schematic netlist.

20. The non-transitory computer-readable medium of claim 18, wherein providing the parasitic parameters includes translating the parasitic parameters from a Detailed Standard Parasitic Format (DSPF) to a Standard Parasitic Exchange Format (SPEF).

* * * * *